Aug. 5, 1941.  T. NYBERG  2,251,522
WINDOW GLASS SET
Filed Sept. 19, 1939
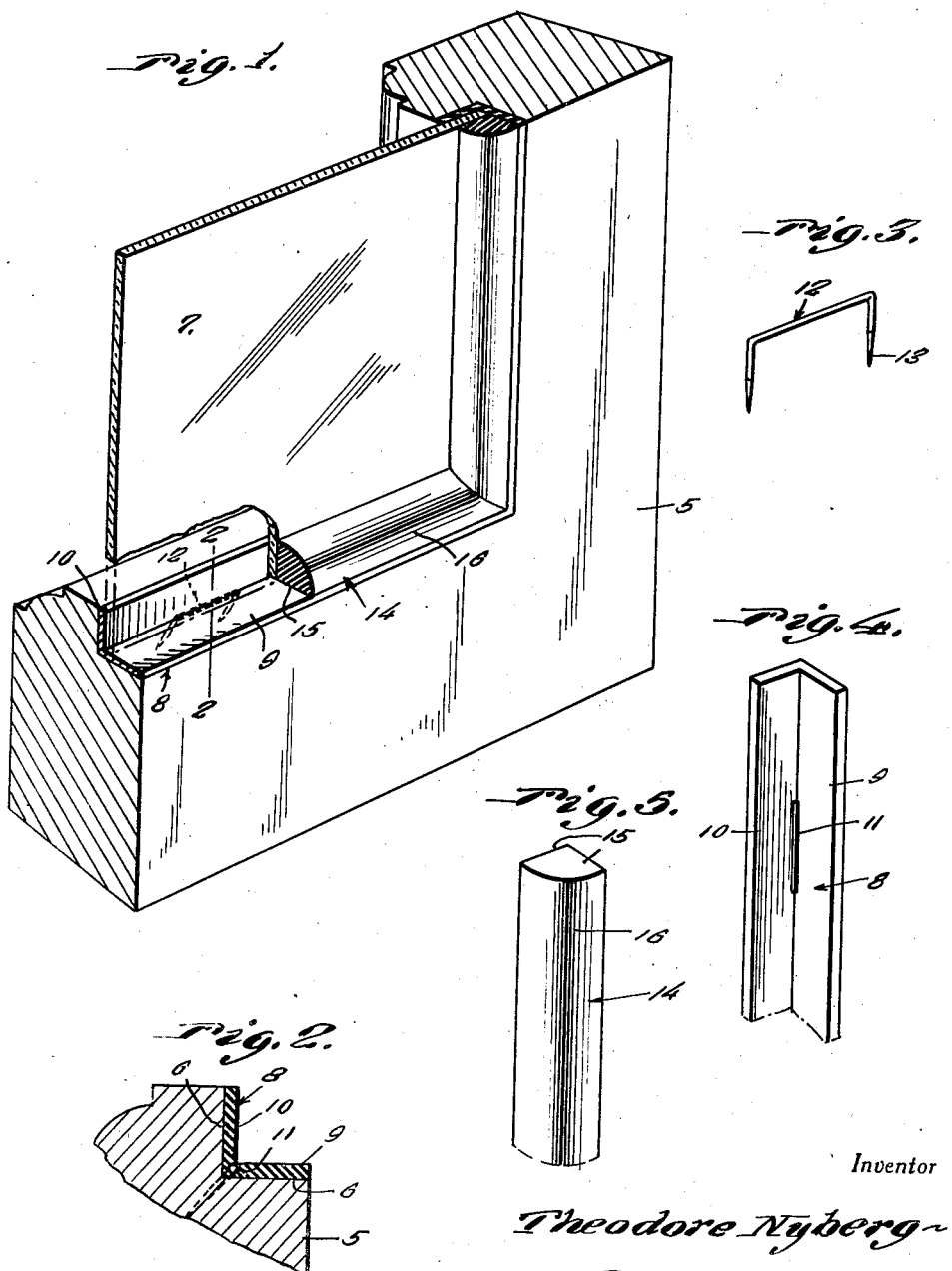
Inventor
Theodore Nyberg
By Clarence A. O'Brien
and Hyman Berman
Attorneys Patented Aug. 5, 1941

2,251,522

UNITED STATES PATENT OFFICE 2,251,522

WINDOW GLASS SET

Theodore Nyberg, Auburn, Maine

Application September 19, 1939, Serial No. 295,681

1 Claim. (Cl. 20—56.4)

This invention relates to window glass sets, and has for the primary object the provision of a device of this character which will eliminate the use of putty and similar material for setting of a window glass in its frame, and which will provide an efficient seal against the passing of air or water between the window glass and the window frame and may be easily and quickly installed at a very nominal cost and which will be durable and easy to clean.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a fragmentary perspective view illustrating a portion of a window glass and a portion of a window frame therefor with the glass set in said frame by the present invention.

Figure 2 is a sectional view taken on the line 2—2 of Figure 1.

Figure 3 is a perspective view illustrating one of the fasteners.

Figure 4 is a fragmentary perspective view illustrating a seal strip.

Figure 5 is a fragmentary perspective view illustrating a second seal strip to coact with the seal strip shown in Figure 4 in setting the glass in the window frame.

Referring in detail to the drawing, the numeral 5 indicates a fragmentary portion of a window frame having the usual angularly related walls 6 to form a seat for a window glass 7. The customary practice has been to secure the glass in the seat by brads and to place putty or similar material in the seat between the latter and the glass for effecting a seal between the glass and the window frame. Such material is of extremely short life and readily deteriorates and becomes loose and falls from place leaving the glass loose in the frame, subject to breakage as well as permitting air and water to pass between the glass and the window frame. Through the use of the present invention these disadvantages are entirely eliminated.

A seal strip 8 constructed of rubber includes angularly related portions 9 and 10 of integral formation. The seal strip 8 is arranged against the angularly related walls 6 of the window frame 5 prior to placing the glass in position. The strip 8 where the portions 9 and 10 join and upon one face thereof is provided with a groove 11. To secure the strip 8 tightly against the angularly related walls 6 of the window frame a plurality of fasteners 12 is employed, each of staple formation having pointed ends 13. The pointed ends of the fasteners are driven through the strip 8 into the window frame with the fasteners or connecting portions thereof lying in the groove 11 so that the material of the strip 8 will overlie the connecting portions of the fasteners and conceal them from view. The glass 7 is then arranged in the window frame on the strip 8. Sealing strips 14 of rubber are then brought into engagement with the glass and any suitable means is used to cause the strips 8 and 14 to readily adhere to each other and coact with each other in establishing a tight seal between the glass and the window frame. Also due to the strips 14 adhering to the strips 8 will prevent displacement of the strips 14. For instance the straight edges of each strip can be made so that these edges will stick to the glass and to the strip 8. The strips 14 are provided with angularly related walls 15 so as to bear evenly against the strips 8 and the glass 7 as clearly shown in Figure 1. The strips 14 further include curved walls 16 which are disposed outermost from the glass and frame to give a neat appearance and to be readily cleansed of foreign matter. With the glass 7 secured in the frame by the present invention the glass will be prevented from rattling and the passing of air or water between the frame and glass and still provide a yieldable seat for the glass in the frame.

It is believed that the foregoing description, when taken in connection with the drawing will fully set forth the construction and advantages of this invention to those skilled in the art to which such a device relates, so that further detailed description will not be required.

Having thus described the invention, what I claim is:

Means for holding a pane of glass in a sash frame comprising an angle-shaped strip of rubber fitting in the pane-receiving groove of the frame, said strip having grooves therein at the junction of the two parts thereof, staples fitting in the grooves and having their limbs passing through the strip into the frame and a second rubber strip having two substantially straight edges arranged at right angles to each other, one for engaging edge portions of the pane and the other one limb of the other strip, the second strip being of substantially triangular shape in cross section and having its straight edges formed to adhere to the glass pane and said limb of the other strip, said two rubber strips constituting the sole means for holding the pane in the sash frame.

THEODORE NYBERG.